(12) United States Patent
Ji et al.

(10) Patent No.: US 11,280,547 B2
(45) Date of Patent: Mar. 22, 2022

(54) SINTERING DEVICE AND SINTERING METHOD THEREOF

(71) Applicants: BOE TECHNOLOGY GROUP CO., LTD., Beijing (CN); ORDOS YUANSHENG OPTOELECTRONICS CO., LTD., Inner Mongolia (CN)

(72) Inventors: Peng Ji, Beijing (CN); Xuwei Li, Beijing (CN)

(73) Assignees: BOE TECHNOLOGY GROUP CO., LTD., Beijing (CN); ORDOS YUANSHENG OPTOELECTRONICS CO., LTD., Ordos (CN)

( * ) Notice: Subject to any disclaimer, the term of this patent is extended or adjusted under 35 U.S.C. 154(b) by 624 days.

(21) Appl. No.: 16/059,653

(22) Filed: Aug. 9, 2018

(65) Prior Publication Data
US 2019/0128609 A1 May 2, 2019

(30) Foreign Application Priority Data
Oct. 30, 2017 (CN) .......................... 201711042761.3

(51) Int. Cl.
*F27B 9/36* (2006.01)
*F27D 99/00* (2010.01)
*F27B 9/12* (2006.01)

(52) U.S. Cl.
CPC ............ *F27B 9/36* (2013.01); *F27D 99/0001* (2013.01); *F27B 9/12* (2013.01); *F27M 2003/04* (2013.01)

(58) Field of Classification Search
CPC ...... F27B 9/00; F27B 9/28; F27B 9/36; F27B 9/12; B65G 11/18; B65G 17/32; B65G 17/323; B65G 17/326; B65G 21/2027; B65G 23/19; B65G 47/1485; B65G 49/061
See application file for complete search history.

(56) References Cited

U.S. PATENT DOCUMENTS 8,278,589 B2 * 10/2012 Millan .................... C04B 35/64
219/121.65
10,120,215 B2 * 11/2018 Shi .......................... B65G 47/91
(Continued)

FOREIGN PATENT DOCUMENTS

| CN | 1517962 A | 8/2004 |
| CN | 101839637 A | 9/2010 |

(Continued)

OTHER PUBLICATIONS

Machine Translation of CN-105097633-A (Year: 2015).*
(Continued)

*Primary Examiner* — Paul A Wartalowicz
*Assistant Examiner* — Ryan L Heckman (57) ABSTRACT

Embodiments of the present disclosure provide a sintering device and a sintering method thereof. The sintering device includes: a housing, defining a chamber; and at least one first heating mechanism and at least one second heating mechanism, disposed in the chamber, wherein the at least one first heating mechanism and the at least one second heating mechanism provide different heating temperatures for a workpiece to be processed.

13 Claims, 2 Drawing Sheets

(56) References Cited

U.S. PATENT DOCUMENTS

| | | | | |
|---|---|---|---|---|
| 2010/0047954 | A1* | 2/2010 | Su | C03B 33/0222 |
| | | | | 438/61 |
| 2011/0139756 | A1* | 6/2011 | Raible | B23K 26/0676 |
| | | | | 219/121.68 |
| 2011/0229650 | A1* | 9/2011 | Inoue | B05D 1/06 |
| | | | | 427/478 |
| 2012/0187105 | A1* | 7/2012 | Parks | F27B 9/243 |
| | | | | 219/388 |
| 2013/0291593 | A1* | 11/2013 | Roh | C03B 33/03 |
| | | | | 65/29.12 |
| 2019/0060134 | A1* | 2/2019 | Piantoni | A61F 13/15764 |

FOREIGN PATENT DOCUMENTS

| | | | | |
|---|---|---|---|---|
| CN | 202304373 | U | | 7/2012 |
| CN | 105097633 | A | * 11/2015 | ............... G02F 1/13 |
| CN | 205279718 | U | | 6/2016 |
| CN | 106766880 | A | | 5/2017 |
| EP | 1439563 | A2 | | 7/2004 |
| JP | 2002-318076 | A | | 10/2002 |

OTHER PUBLICATIONS

The First Chinese Office Action dated Jan. 7, 2019; Appln. No. 201711042761.3.
The Second Chinese Office Action dated Aug. 15, 2019; Appln. No. 201711042761.3.

* cited by examiner

SINTERING DEVICE AND SINTERING METHOD THEREOF

TECHNICAL FIELD

At least one embodiment of the present disclosure relates to a sintering device and a sintering method thereof.

BACKGROUND

In the manufacturing process of electronic products, encapsulation technology must be adopted to protect components inside electronic display products. Sealant used for encapsulation is usually required to be sintered to improve the reliability of the sealant.

Sintering process generally includes low-temperature heating process and high-temperature heating process, so the process is usually respectively performed in two devices. Thus, the space utilization rate of the device is low, and the movement of the product between the two devices may affect the processing yield of the product.

SUMMARY

At least one embodiment of the present disclosure provides a sintering device, which comprises: a housing, defining a chamber; and at least one first heating mechanism and at least one second heating mechanism, disposed in the chamber, wherein the at least one first heating mechanism and the at least one second heating mechanism provide different heating temperatures for a workpiece to be processed.

For example, the sintering device provided by at least one embodiment of the present disclosure further comprises: a bearing mechanism, disposed in the chamber and configured to hold at least one workpiece to be processed and allow the workpiece to be processed to be movable along a first track, wherein the first heating mechanism and the second heating mechanism are arranged along the first track.

For example, in the sintering device provided by at least one embodiment of the present disclosure, the bearing mechanism includes at least one bearing position, and the at least one bearing position is configured to hold the workpiece to be processed; and one of the bearing positions is configured to be aligned with any one of the first heating mechanism and the second heating mechanism.

For example, in the sintering device provided by at least one embodiment of the present disclosure, the bearing mechanism includes at least two bearing positions; and any two of the bearing positions are configured to be respectively aligned with the first heating mechanism and the second heating mechanism.

For example, in the sintering device provided by at least one embodiment of the present disclosure, a shape of the first track is straight line, curved line or zigzag line; and a movement mode of the bearing position along the first track is reciprocating movement or one-way movement.

For example, in the sintering device provided by at least one embodiment of the present disclosure, a shape of the first track is a closed ring.

For example, in the sintering device provided by at least one embodiment of the present disclosure, at least one of the first heating mechanism or the second heating mechanism is a laser beam heating unit.

For example, the sintering device provided by at least one embodiment of the present disclosure further comprises: at least one fine adjusting unit, configured to adjust positions of the first heating mechanism and the second heating mechanism so as to be aligned with a region to be heated of the workpiece to be processed.

For example, in the sintering device provided by at least one embodiment of the present disclosure, a support frame is disposed in each of the at least two bearing positions of the bearing mechanism and configured to fix the workpiece to be processed.

For example, in the sintering device provided by at least one embodiment of the present disclosure, the support frame includes an adsorption unit, a base, a clamping structure disposed on the base, and vent holes formed in the base; the clamping structure defines the workpiece to be processed; and the adsorption unit is configured to fix the workpiece to be processed through the vent holes.

For example, in the sintering device provided by at least one embodiment of the present disclosure, one of the first heating mechanism and the second heating mechanism is configured to adopt high-temperature heating mode, and the other is configured to adopt low-temperature heating mode.

For example, in the sintering device provided by at least one embodiment of the present disclosure, both the first heating mechanism and the second heating mechanism are configured to be switchable between the high-temperature heating mode and the low-temperature heating mode.

At least one embodiment of the present disclosure provides a sintering method employing a sintering device, the sintering device includes: a housing, defining a chamber; and at least one first heating mechanism and at least one second heating mechanism, disposed in the chamber, wherein the at least one first heating mechanism and the at least one second heating mechanism provide different heating temperatures for a workpiece to be processed; and the sintering method comprises: placing the workpiece to be processed into the chamber; and heating the workpiece to be processed by adoption of the first heating mechanism and the second heating mechanism to provide different heating temperatures.

For example, in the sintering method provided by at least one embodiment of the present disclosure, one of the first heating mechanism and the second heating mechanism is configured to adopt high-temperature heating mode, and the other is configured to adopt low-temperature heating mode; the heating temperature of the high-temperature heating mode is higher than the heating temperature of the low-temperature heating mode; and the workpiece to be processed is subjected to low-temperature heating at first and then subjected to high-temperature heating.

For example, in the sintering method provided by at least one embodiment of the present disclosure, the sintering device further includes a bearing mechanism which is disposed in the chamber and configured to hold the workpiece to be processed; the bearing mechanism includes at least one bearing position for holding the workpiece to be processed; and the method comprises: moving the bearing position of the bearing mechanism to a loading position; placing the workpiece to be processed in the chamber and loading the workpiece to be processed to the bearing position; driving the bearing mechanism so that the bearing position is aligned with the second heating mechanism, and heating the workpiece to be processed by using the second heating mechanism; driving the bearing mechanism so that the bearing position is aligned with the first heating mechanism, and heating the workpiece to be processed by using the first heating mechanism; and driving the bearing mechanism so that the bearing position moves to an unloading position, in which the first heating mechanism adopts high-temperature heating mode and the second heating mechanism adopts low-temperature heating mode.

BRIEF DESCRIPTION OF THE DRAWINGS

Simple description will be given below to the accompanying drawings of the embodiments to provide a more clear understanding of the technical proposals of the embodiments of the present disclosure. Obviously, the drawings described below only involve some embodiments of the present disclosure but are not intended to limit the present disclosure.

Reference numerals of the accompanying drawings:
1000—sintering device; 100—housing; 110—chamber; 201—fine adjusting unit; 210—first heating mechanism; 220—second heating mechanism; 300—bearing mechanism; 301—support shaft; 302—roller; 310—bearing position; 320—support frame; 321—base; 322—clamping structure; 323—vent hole; 400—loading and unloading port; 410—first loading and unloading port; 420—second loading and unloading port.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, "on," "under," or the like are only used to indicate relative position relationship, and when the position of the object which is described is changed, the relative position relationship may be changed accordingly.

At least one embodiment of the present disclosure provides a sintering device, which comprises: a housing, defining a chamber; and at least one first heating mechanism and at least one second heating mechanism, disposed in the chamber, wherein the at least one first heating mechanism and the at least one second heating mechanism provide different heating temperatures for a workpiece to be processed. The workpiece to be processed may be subjected to the sintering process at different temperatures in the same chamber, and is not required to be transferred between different chambers (or devices). Thus, the process consuming time can be reduced, the processing yield of the workpiece can be improved, the number of the apparatuses which are used in the process can be decreased, the space utilization rate of the device can be improved, and the process cost can be reduced.

Description will be given below to the sintering device and the sintering method thereof, provided by at least one embodiment of the present disclosure, with reference to the accompanying drawings.

Figure 1:
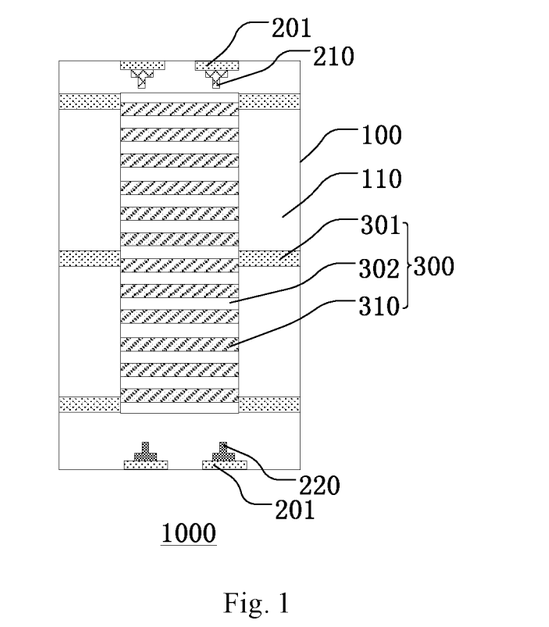
FIG. 1 is a front view of a sintering device provided by an embodiment of the present disclosure.
Figure 2:
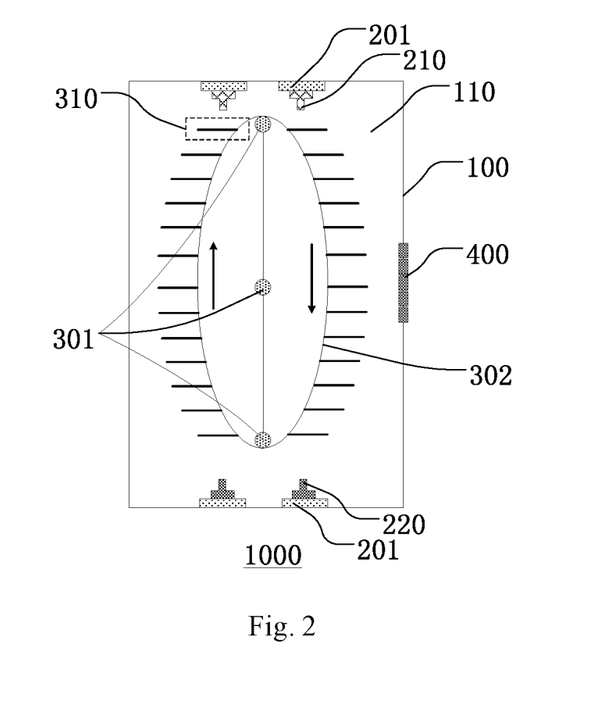
FIG. 2 is a side view of the sintering device as shown in FIG. 1.
Figure 3:
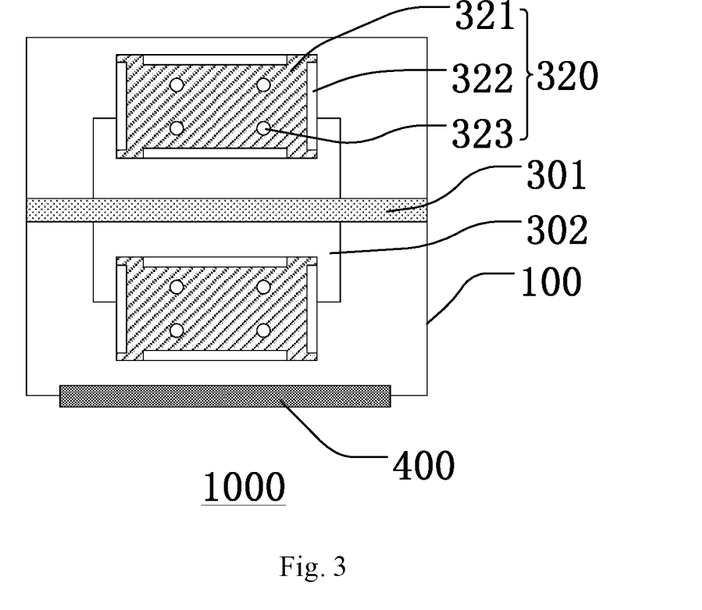
FIG. 3 is a top view of the sintering device as shown in FIG. 1.

FIG. 1 is a front view of a sintering device provided by an embodiment of the present disclosure. FIG. 2 is a side view of the sintering device as shown in FIG. 1. FIG. 3 is a top view of the sintering device as shown in FIG. 1.

For instance, in at least one embodiment of the present disclosure, as shown in FIGS. 1 and 2, the sintering device 1000 comprises: a housing 100, defining a chamber 110; and at least one first heating mechanism 210 and at least one second heating mechanism 220 disposed in the chamber 110, in which the first heating mechanism 210 and the second heating mechanism 220 provide different heating temperatures for a workpiece to be processed. For instance, the first heating mechanism 210 and the second heating mechanism 220 may respectively adopt the sintering process at different temperatures to process the workpiece to be processed in the chamber 110.

In the embodiment of the present disclosure, the type of the workpiece to be processed which is treated by the sintering device is not limited, as long as the sintering process of the workpiece to be processed needs to be performed at different temperatures. Illustratively, in the encapsulation process of a display panel, sealant needs to be filled between a substrate and a cover for cell-assembled encapsulation; the sealant must be cured by sintering; and the sintering process of the sealant may include low-temperature heating process and high-temperature heating process. Low-temperature heating may initially cure encapsulating materials to maintain its form and may preheat the encapsulating materials. High-temperature heating may remove partial additive and solvent in the encapsulating materials and allow corresponding materials to react to obtain the final sealant.

Description will be given below to the technical proposal in at least one embodiment of the present disclosure by taking the case that the workpiece to be processed is the display panel and the sintering device is applied to the sintering processes of low-temperature heating and high-temperature heating of the sealant in the display panel as an example.

For instance, in at least one embodiment of the present disclosure, one of the first heating mechanism and the second heating mechanism is configured to adopt high-temperature heating mode, and the other is configured to adopt low-temperature heating mode. The heating temperature of the high-temperature heating mode is higher than the heating temperature of the low-temperature heating mode. Thus, the workpiece to be processed may be respectively subjected to the sintering processes of low-temperature heating and high-temperature heating.

For instance, in at least one embodiment of the present disclosure, the first heating mechanism and the second heating mechanism may be fixedly set to be that one adopts high-temperature heating mode and the other adopts low-temperature heating mode. For instance, in at least one embodiment of the present disclosure, both the first heating mechanism and the second heating mechanism are configured to be switchable between high-temperature heating mode and low-temperature heating mode. In the embodiment of the present disclosure, whether the first heating mechanism and the second heating mechanism can be switched between the high-temperature heating mode and the low-temperature heating mode is not limited, as long as the workpiece to be processed may, for instance, be subjected to low-temperature heating at first and then subjected to high-temperature heating.

Description will be given below to the content in at least one embodiment of the present disclosure by taking the case that the first heating mechanism adopts high-temperature heating mode and the second heating mechanism adopts low-temperature heating mode as an example.

For instance, in at least one embodiment of the present disclosure, the heating temperature of the first heating mechanism is higher than the heating temperature of the second heating mechanism. For instance, as shown in FIGS. 1 and 2, the heating temperature of the first heating mechanism 210 to the display panel is higher than the heating temperature of the second heating mechanism 220 to the display panel. Illustratively, in the sintering process, the second heating mechanism 220 may be adopted for the low-temperature heating of the encapsulating materials in the display panel, the preheating of the encapsulating materials, and the initial curing of the encapsulating materials; and subsequently, the first heating mechanism is adopted for the high-temperature heating of the encapsulating materials in the display panel, and then the sintering process of the sealant is completed.

In the embodiment of the present disclosure, the specific value of the heating temperature provided by the first heating mechanism and the second heating mechanism in the high-temperature heating mode or the low-temperature heating mode is not limited, and the actual heating temperature of the first heating mechanism and the second heating mechanism may be selected according to the type of the workpiece to be processed and relevant process conditions. For instance, in at least one embodiment of the present disclosure, the heating temperature of the high-temperature heating mode is 150-1,000° C., and the heating temperature of the low-temperature heating mode is 80-500° C. Illustratively, when the heating temperature of the first heating mechanism is higher than the heating temperature of the second heating temperature, the heating temperature provided by the first heating mechanism for the workpiece to be processed is about 150-1,000° C., and moreover, for instance, is about 150-500° C.; and the heating temperature provided by the second heating mechanism for the workpiece to be processed is about 80-500° C., and moreover, is about 80-150° C.

The embodiment of the present disclosure does not limit the implementation manner that the workpiece to be processed is heated by the second heating mechanism and then heated by the first heating mechanism. For instance, the first heating mechanism and the second heating mechanism may be moved to realize the heating of the workpiece to be processed at different temperatures. For instance, the workpiece to be processed may be moved to realize the heating of the workpiece to be processed by the first heating mechanism and the second heating mechanism. Description will be given below to the technical proposal in at least one embodiment of the present disclosure by taking the mode that the workpiece to be processed is moved to realize the sintering process at different temperatures as an example.

For instance, in at least one embodiment of the present disclosure, the sintering device may further comprise: a bearing mechanism, disposed in the chamber and configured to bear at least one workpiece to be processed and allow the workpiece to be processed to move along a first track, in which the first heating mechanism and the second heating mechanism are arranged along the first track. Illustratively, as shown in FIGS. 1 and 2, a bearing mechanism 300 is arranged in the chamber 110 and may be configured to bear the workpiece to be processed and allow the workpiece to be processed to move along a fixed track, e.g., the first track, and the first heating mechanism 210 and the second heating mechanism 220 are arranged along the first track. Thus, each workpiece to be processed may be heated by the first heating mechanism 210 and the second heating mechanism 220.

The first track may be a movement track of the workpiece to be processed held by the bearing mechanism and may be set according to the specific structure of the bearing mechanism, the positional relationships between the bearing mechanism and the first heating mechanism and the second heating mechanism, etc. No limitation will be given here in the embodiment of the present disclosure. For instance, in the sintering device provided by at least one embodiment of the present disclosure, as shown in FIGS. 1 and 2, a shape of the first track may be a closed ring. For instance, in the sintering device provided by at least one embodiment of the present disclosure, the shape of the first track may be straight line, curved line or zigzag line, and the movement mode of bearing positions along the first track is reciprocating movement or one-way movement.

Description will be given below to the technical proposal in at least one embodiment of the present disclosure by taking the case that the shape of the first track as shown in FIGS. 1 and 2 is a closed ring as an example.

For instance, in the sintering device provided by at least one embodiment of the present disclosure, the bearing mechanism includes at least one bearing position; the bearing position is configured to bear the workpiece to be processed; and one of the bearing positions is configured to be aligned with any one of the first heating mechanism and the second heating mechanism. Illustratively, as shown in FIG. 2, the bearing mechanism includes at least one bearing position 310, and the workpiece to be processed may be mounted at the bearing position 310. In actual processes, the bearing mechanism 300 operates so that the bearing position 310 may be aligned with, for instance, the first heating mechanism 210. Thus, the first heating mechanism 210 may heat the workpiece to be processed disposed in the bearing position 310. Correspondingly, the bearing mechanism 300 may also drive the bearing position 310 to be aligned with the second heating mechanism 220, so that the second heating mechanism 220 may heat the workpiece to be processed disposed in the bearing position 310.

For instance, in at least one embodiment of the present disclosure, as shown in FIGS. 1 and 2, the bearing mechanism 300 may include a support shaft 301 and a roller 302 supported by the support shaft 301. For instance, the bearing position 310 is disposed on the roller 302, and the roller 302 rotates around the support shaft 301. Thus, the bearing position 310 may be driven to move so as to be aligned with the first heating mechanism 210 or the second heating mechanism 220.

The embodiment of the present disclosure does not limit structures in the bearing mechanism relevant to the rotation mode of the roller 302, as long as the roller 302 may rotate and drive the bearing position 310 (or the workpiece to be processed in the bearing position 310) on the roller to move along the first track. For instance, the roller 302 may be a transmission belt, e.g., a transmission belt of a chain structure. For instance, the support shaft 301 may support the overall shape of the roller 302, and may be further set to be a driving structure to drive the roller 302 to rotate. In the embodiment of the present disclosure, the bearing mechanism 300 may also be provided with a structure for supporting the profile of the roller 302, e.g., a frame (not shown in the figure), so as to further support the roller 302 and allow the bearing positions 310 on the roller 302 to distribute along the first track. Illustratively, the frame may support the roller 302 so that the shape of the first track may be the elliptical shape as shown in FIG. 2, and the structure of the frame may be designed according to the specific shape of the first track. No limitation will be given here in the embodiment of the present disclosure.

In the embodiment of the present disclosure, the number of the bearing positions arranged in the bearing mechanism is not limited and may be designed according to actual processes.

For instance, in at least one embodiment of the present disclosure, the bearing mechanism includes at least two bearing positions, and any two of the bearing positions are configured to be respectively aligned with the first heating mechanism and the second heating mechanism. Thus, the sintering device can simultaneously heat (high-temperature heating or low-temperature heating) two workpieces to be processed, so the working performance of the sintering device can be improved.

For instance, in at least one embodiment of the present disclosure, the bearing mechanism may include two hearing positions, and the two bearing positions are configured to be respectively aligned with the first heating mechanism and the second heating mechanism. Illustratively, in the sintering device 1000 as shown in FIG. 2, the bearing mechanism 300 includes two bearing positions 310, e.g., a first bearing position and a second bearing position. When one of the two bearing positions 310, for instance, the first bearing position, is aligned with the first heating mechanism 210, the other one of the two bearing positions 310, for instance, the second bearing position, is aligned with the second heating mechanism 220. Thus, the workpieces to be processed in the first bearing position and the second bearing position nay be respectively and simultaneously heated. Along with the operation of the bearing mechanism 300, when the first bearing position is aligned with the second heating mechanism 220, the second bearing position is aligned with the first heating mechanism 210. In the circulatory movement process of the bearing mechanism 300, not only each workpiece to be processed can complete the sintering processes of low-temperature heating and high-temperature heating but also the workpieces to be processed in the two bearing positions 310 can be simultaneously heated, so the working efficiency of the sintering device 1000 can be improved.

For instance, in at least one embodiment of the present disclosure, the bearing mechanism may include more than two bearing positions, and any two of the more than two bearing positions are configured to be respectively aligned with the first heating mechanism and the second heating mechanism. Illustratively, in the sintering device 1000 as shown in FIG. 2, the bearing mechanism 300 may include more than two bearing positions 310. For instance, when any one of the plurality of bearing positions 310 in the bearing mechanism 300 is aligned with the first heating mechanism 210, the other one of the remaining bearing positions 310 may be aligned with the second heating mechanism 220. For instance, the loading and unloading operations of the workpiece to be processed may also be performed on the bearing position 310 which is not aligned with the first heating mechanism 210 and not aligned with the second heating mechanism 220. For instance, the workpiece to be processed, which has been processed, is unloaded and a new workpiece to be processed is loaded, so the bearing mechanism 300 can be in fully loaded state, and hence the space utilization rate of the sintering device can be improved. In the driving procedure of the bearing mechanism 300, the sintering device 1000 may simultaneously heat the workpieces to be processed in the two bearing positions 310, and the workpiece to be processed in each bearing position 310 may be heated by the first heating mechanism 210 and the second heating mechanism 220. Thus, the sintering device 1000 can complete the sintering process of the workpiece to be processed by streamline automated operation, and improve the working efficiency of the sintering device 1000.

For instance, in at least one embodiment of the present disclosure, when any one of the plurality of bearing positions 310 in the bearing mechanism 300 is aligned with the first heating mechanism 210, the other bearing positions 310 may also be not aligned with the second heating mechanism 220. Thus, the workpieces to be processed in the plurality of bearing positions may be sintered by being heated by the first heating mechanism 210 and the second heating mechanism 220 one by one. No limitation will be given here in the embodiment of the present disclosure. Compared with the mode that the two workpieces to be processed are simultaneously heated by the first and second heating mechanisms, this mode can prolong the process time. In the case that the two workpieces to be processed are simultaneously heated by the first and second heating mechanisms, the heating time, the heating intensity and the like of the first and second heating mechanisms may be adjusted. For instance, when the heating mechanism adopts laser beam heating, the light intensity may be adjusted so that the heating time of the first and second heating mechanisms may be same, and hence the process time can be shortened.

In the embodiment of the present disclosure, the setting number of the heating mechanisms is not limited. For instance, only one first heating mechanism 210 and one second heating mechanism 220 may be arranged in the chamber 110 of the sintering device 1000. For instance, a plurality of first heating mechanisms 210 and a plurality of second heating mechanisms 220 may be arranged in the chamber 110 of the sintering device 1000. The plurality of first heating mechanisms 210 are adjacent to each other and arranged in one group, and the plurality of second heating mechanisms 220 are adjacent to each other and arranged in one group. Thus, the workpieces to be processed in the plurality of bearing positions 310 can be heated once only, and hence the working efficiency of the sintering device 1000 can be improved.

In the embodiment of the present disclosure, the type of the heating mechanisms (including the first heating mechanism and the second heating mechanism) is not limited, as long as the heating mechanisms can heat the workpieces to be processed in a part of the bearing positions in the bearing mechanism and will not affect the workpieces to be processed in other bearing positions.

For instance, in the sintering device provided by at least one embodiment of the present disclosure, at least one of the first heating mechanism or the second heating mechanism may be a laser beam heating unit. For instance, in the display panel, the sealant is distributed along an edge of the display panel and has small width. Laser beam heating has the advantages of low requirement on the ambient temperature, rapid heating speed, uniform spot energy distribution, good directivity of laser beams, and capability of realizing accurate positioning, and hence can be adopted to rapidly heat only the sealant in the display panel.

For instance, in the sintering device provided by at least one embodiment of the present disclosure, at least one of the first heating mechanism or the second heating mechanism may be a resistance wire heating unit, a hot air blowing heating unit or in other heating modes. The above heating unit may be set to only heat a part of a region in the chamber, namely only heat the workpiece to be processed in the bearing position aligned with the heating mechanism and not affecting the workpieces to be processed in other bearing positions.

Description will be given below to the technical proposal in the embodiment of the present disclosure by taking the case that both the first heating mechanism and the second heating mechanism are a laser beam heating unit as an example.

For instance, in at least one embodiment of the present disclosure, the laser type of the laser beam heating unit may be infrared laser, for instance, may be laser with the wavelength of about 760-820 nm, moreover, about 780-805 nm.

In the embodiment of the present disclosure, laser is adopted to heat the workpieces to be processed, and the time of the laser beam heating unit in heating one workpiece to be processed is different according to different dimensions of the workpieces to be processed, e.g., the display panels, the material composition of a structure to be heated, e.g., the sealant, different heating temperatures which are actually required, etc. Illustratively, the time of the laser beam heating unit in heating each workpiece to be processed may be about 130 to 1,000 seconds. The production time per workpiece of each workpiece to be processed can be reduced by the reasonable design of the number of the bearing positions in the bearing mechanism, so the working efficiency of the sintering device can be improved. Illustratively, in the embodiment as shown in FIGS. 1 and 2, the number of the bearing positions 310, loaded with the workpieces to be processed, in the bearing mechanism 300 may be set to not exceed 30, so that the production time per workpiece of each workpiece to be processed can be, for instance, within 1 to 2 hours.

In actual processes, a region to be heated of the workpieces to be processed needs to be aligned with the heating mechanisms, so as to ensure the processing yield. For instance, the sintering device provided by at least one embodiment of the present disclosure further comprises: at least one fine adjusting unit. The fine adjusting unit is configured to adjust the position of the first heating mechanism and the second heating mechanism so as to be aligned with the region to be heated. Thus, after the first heating mechanism and/or the second heating mechanism is aligned with the workpiece to be processed, the fine adjusting unit is adopted to adjust the first and/or second heating mechanism to be aligned with the region to be heated. Illustratively, as shown in FIGS. 1 and 2, the sintering device 1000 may comprise at least one fine adjusting unit 201. In the heating process of the workpiece to be processed, when the bearing position 310 in the bearing mechanism 300 is moved to a position opposite to the first heating mechanism 210 or the second heating mechanism 220, the fine adjusting unit 201 may adjust the position of the first heating mechanism 210 and the second heating mechanism 220 so as to be aligned with the region to be heated of the workpieces to be processed, so the processing yield can be improved.

It should be noted that: in the embodiment of the present disclosure, "alignment" may be that the bearing mechanism rotates so that the workpiece to be processed on the bearing position may enter an effective working region of the heating mechanism (the first heating mechanism and/or the second heating mechanism), may be that a center of the workpiece to be processed is directly opposite to a center of the heating mechanism, and may also be that one part of the workpiece to be processed is directly opposite to one part of the heating mechanism. No limitation will be given here in the embodiment of the present disclosure, as long as the heating mechanism can heat and sinter the workpiece to be processed. The "alignment" indicates that after the bearing position enters the effective working region of the heating mechanism, the positioning of the region to be heated in the workpiece to be processed by the heating mechanism may be that the center of the region to be heated is directly opposite to the center of the heating mechanism and may also be that one part of the workpiece to be processed is directly opposite to one part of the heating mechanism. No limitation will be given here in the embodiment of the present disclosure. The effective working region is a region capable of performing heating operation in the heating mechanism. Taking the case that the heating mechanism is the laser beam heating unit as an example, a laser beam provides heating temperature satisfying the requirement of the sintering process (high-temperature heating or low-temperature heating) in the effective region.

In the embodiment of the present disclosure, the specific structure of the fine adjusting unit is not limited and may be determined according to actual processes.

For instance, in at least one embodiment of the present disclosure, the fine adjusting unit may include a steering structure. The structure may adjust the emission direction of the laser beam of the heating mechanism, e.g., the laser beam heating unit. Thus, the sensitivity of the laser beam heating unit and the range of the heating region can be improved.

For instance, in at least one embodiment of the present disclosure, the fine adjusting unit may include a unit capable of adjusting the position of the heating mechanism, e.g., a servo motor group. Thus, the position of the heating mechanism may be adjusted along with the distribution of the region to be heated of the workpiece to be processed. Illustratively, taking the sealant in the display panel as an example, the fine adjusting unit may control the first heating mechanism or the second heating mechanism to move along a distribution track of the sealant, so as to ensure the yield of the sintering process of the sealant.

For instance, in at least one embodiment of the present disclosure, the fine tuning unit may include structures such as a distance adjustment assembly, e.g., a distance sensor. In actual technical process, the distance sensor may detect the surface distance between the heating mechanism and the workpiece to be processed, so as to adjust the heating mechanism to an appropriate position, and hence the processing yield of the workpieces to be processed can be improved.

The embodiment of the present disclosure does not limit the fixing manner of the workpiece to be processed in the bearing position, as long as the workpiece to be processed can be retained in the bearing position and the heating mechanism can heat the region to be heated of the workpiece to be processed.

For instance, in the sintering device provided by at least one embodiment of the present disclosure, a support frame is disposed in each bearing position of the bearing mechanism and configured to fix the workpiece to be processed. Illustratively, as shown in FIG. 3, a support frame 320 is disposed in the bearing position 310. The support frame may fix the workpiece to be processed. For instance, the support frame 320 may be fixed on the roller 302 of the bearing mechanism 300. Thus, in the rotation process of the roller 302, the workpiece to be processed in the support frame 320 will be driven to rotate synchronously.

In the embodiment of the present disclosure, the specific structure of the support frame in the sintering device is not limited, as long as the support frame can fix the workpiece to be processed.

For instance, in at least one embodiment of the present disclosure, the support frame includes an adsorption unit, a base, a clamping structure disposed on the base, and vent holes formed in the base. The clamping structure retains the workpiece to be processed, and the adsorption unit is configured to fix the workpiece to be processed through the vent holes. Illustratively, as shown in FIG. 3, the support frame 320 includes a base 321 and a clamping structure 322 disposed on the base 321. When the workpiece to be processed, for instance, the display panel, is placed on the base 321, the clamping structure 322 may fix and retain the display panel. For instance, the support frame 320 may further include an adsorption unit (not shown in the figure), and a plurality of vent holes 323 are formed in the base 321. The adsorption unit provides vacuum adsorption force through the vent holes 323 so as to further fix the workpiece to be processed. In the embodiment of the present disclosure, the setting position of the adsorption unit is not limited, as long as the adsorption unit can provide vacuum adsorption force through the vent holes 323.

In the embodiment of the present disclosure, when the first track is in the shape of a closed ring, the relationship between a plane in which the workpiece to be processed is located and the first track is not limited. Description will be given below by taking the display panel as an example.

For instance, in at least one embodiment of the present disclosure, as shown in FIGS. 1, 2 and 3, in each bearing position 310, a tangent of the first track is basically perpendicular to a direction of a surface in which the display panel is located, namely the base 321 may be upright on the roller 302 by being perpendicular to the first track. Thus, the occupied space of each display panel on the roller 302 can be reduced, and the number of the display panels capable of being held by the bearing mechanism 300 can be increased.

For instance, in at least one embodiment of the present disclosure, in each bearing position, the tangent of the first track is basically parallel to a direction of a surface in which the display panel is located, namely the base may lie on the roller by being parallel to the first track. Thus, it is benefit for the heating mechanism (e.g., the first heating mechanism or the second heating mechanism) to be aligned with the region to be heated of the display panel.

For instance, in at least one embodiment of the present disclosure, as shown in FIGS. 2 and 3, the sintering device 1000 may further comprise a loading and unloading port 400. The loading and unloading port 400 may be disposed on the housing 100. By adoption of the loading and unloading port 400, the workpiece which has been heated may be picked out and a new workpiece to be processed may be placed. Illustratively, in the sintering process, after the workpiece to be processed is placed through the loading and unloading port 400, the bearing mechanism 300 operates so as to drive the workpiece to be processed to move along the first track; the workpiece to be processed is heated by the second heating mechanism 220 at first and then heated by the first heating mechanism 210; and subsequently, the workpiece to be processed reruns to the loading and unloading port 400 and is picked out through the loading and unloading port 400. In the above process, when the bearing mechanism operates every step (the process from the time when the heating mechanism, e.g., the first heating mechanism 210, begins to heat one workpiece to be processed to the time when the heating mechanism begins to heat the next workpiece to be processed), one workpiece which has been heated may be picked out and a new workpiece to be processed may be placed, so that the bearing position 310 on the bearing mechanism 300 can be fully utilized and the bearing mechanism 300 can be always in the fully loaded state, and hence the space utilization rate of the sintering device 1000 can be improved.

In the embodiment of the present disclosure, when the first track as shown in FIGS. 1, 2 and 3 is in the shape of a closed ring, the specific shape of the first track is not limited. For instance, the first track may be the elliptical shape as shown in FIG. 2 and may also be circular, rectangular, polygonal or in other shapes.

It should be noted that in the embodiment of the present disclosure, the shape of the moving track (the first track) of the workpiece to be processed held by the bearing mechanism is not limited, and the shape of the first track is not limited to be the closed ring.

For instance, in the sintering device provided by at least one embodiment of the present disclosure, the shape of the first track is straight line, curved line or zigzag line, and the movement mode of the bearing position in the bearing mechanism along the first track is reciprocating movement or one-way movement.

Figure 4:
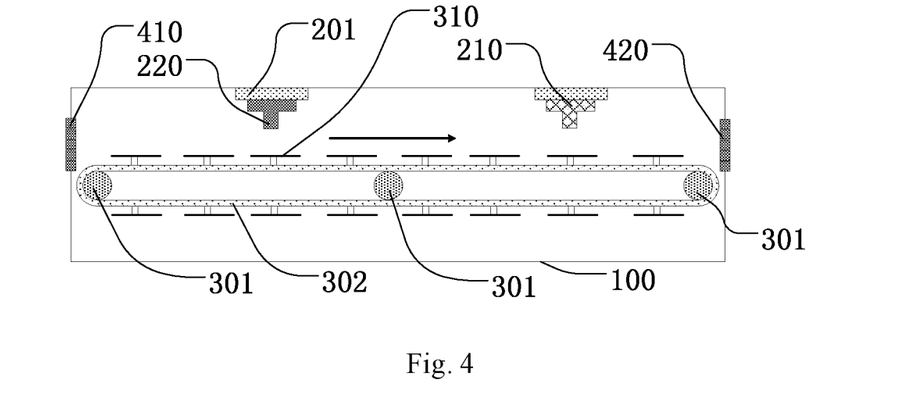
FIG. 4 is a schematic diagram of another sintering device provided by an embodiment of the present disclosure.

FIG. 4 is a schematic diagram of another sintering device provided by one embodiment of the present disclosure. For instance, in at least one embodiment of the present disclosure, as shown in FIG. 4, the moving track of the workpiece to be processed held by the bearing mechanism 300 may be one-way movement non-closed line type, and a first loading and unloading port 410 and a second loading and unloading port 420 may be respectively disposed on the housing 100 at both ends of the first track. Illustratively, the workpiece to be processed is placed in the bearing position 310 through the first loading and unloading port 410; the bearing mechanism 300 operates so that the workpiece to be processed may be heated by the second heating mechanism 220 at first and then heated by the first heating mechanism 210; and subsequently, the workpiece to be processed moves to the second loading and unloading port 420 and is took out through the second loading and unloading port 420. In the above process, the moving track (the first track) of the workpiece to be processed may be straight line, curved line, zigzag line, etc.

For instance, in at least one embodiment of the present disclosure, as shown in FIG. 4, the moving track of the workpiece to be processed held by the bearing mechanism 300 may be reciprocating movement non-closed line type. For instance, in the embodiment as shown in FIG. 4, the second loading and unloading port 420 may be not arranged. Illustratively, the workpiece to be processed is placed in the hearing position 310 through the first loading and unloading port 410; the bearing mechanism 300 operates so that the workpiece to be processed may be heated by the second heating mechanism 220 at first and then heated by the first heating mechanism 210; and subsequently, the bearing mechanism 300 operates reversely so that the workpiece to be processed may return to the first loading and unloading port 410, and the workpiece to be processed is took out through the first loading and unloading port 410.

At least one embodiment of the present disclosure provides a sintering method employing a sintering device. The sintering device includes: a housing, defining a chamber; and at least one first heating mechanism and at least one second heating mechanism disposed in the chamber, wherein the at least one first heating mechanism and the at least one second heating mechanism provide different heating temperatures for a workpiece to be processed. The sintering method of the sintering device comprises: placing the workpiece to be processed into the chamber; and heating the workpiece to be processed at different heating temperatures by adoption of the first heating mechanism and the second heating mechanism. In the above sintering method, the workpiece to be processed may be subjected to the sintering process at different temperatures in the same chamber and is not required to be transferred between different chambers (or devices). Thus, the sintering method reduces the process consuming time, improves the processing yield of the workpiece to be processed, reduces the number of the devices which are used in the method, improves the space utilization rate of the device, and reduces the process cost.

For instance, in the sintering method provided by at least one embodiment of the present disclosure, one of the first heating mechanism and the second heating mechanism is configured to adopt high-temperature heating mode, and the other one is configured to adopt low-temperature heating mode; the heating temperature of the high-temperature heating mode is higher than the heating temperature of the low-temperature heating mode; and the workpiece to be processed is subjected to low-temperature heating at first and then subjected to high-temperature heating. Thus, the workpiece to be processed may be respectively subjected to the sintering processes of low-temperature heating and high-temperature heating.

For instance, in the sintering method provided by at least one embodiment of the present disclosure, the first heating mechanism adopts high-temperature heating mode and the second heating mechanism adopts low-temperature heating mode; and the workpiece to be processed is heated by the second heating mechanism at first and then heated by the first heating mechanism. The first heating mechanism and the second heating mechanism are respectively adopted to heat the workpiece to be processed, so that the workpiece to be processed can be subjected to the sintering processes of low-temperature heating and high-temperature heating.

For instance, in the sintering method provided by at least one embodiment of the present disclosure, the sintering device further comprises a bearing mechanism which is disposed in the chamber and configured to hold the workpiece to be processed. The bearing mechanism includes at least one bearing position for holding the workpiece to be processed. The method comprises: moving the bearing position of the bearing mechanism to a loading position; placing the workpiece to be processed into the chamber and loading the workpiece to be processed to the bearing position; driving the bearing mechanism so that the bearing position may be aligned with the second heating mechanism, and heating the workpiece to be processed through the second heating mechanism; driving the bearing mechanism so that the bearing position may be aligned with the first heating mechanism, and heating the workpiece to be processed through the first heating mechanism; and driving the bearing mechanism so that the bearing position is moved to an unloading position, in which the first heating mechanism adopts high-temperature heating mode and the second heating mechanism adopts low-temperature heating mode. By adoption of the bearing mechanism, the sintering device can complete the sintering process of the workpiece to be processed by streamline automated operation mode, so the working efficiency of the sintering device can be improved.

The loading position of the workpiece to be processed loaded to the bearing position and the unloading position of the workpiece to be processed where the workpiece will be took out are located in the same region of the sintering device. The loading position or the unloading position may refer to the loading and unloading port 400 in the embodiment as shown in FIG. 2. For instance, in at least one embodiment of the present disclosure, the sintering method of the sintering device further comprises: taking out the workpiece and placing a new workpiece to be processed at the same position after the first heating mechanism and the second heating mechanism heat the workpiece to be processed. Thus, the bearing mechanism can be always in the fully loaded state, so as to ensure that the sintering device has high space utilization rate.

In the embodiment of the present disclosure, the loading and unloading modes of the workpiece to be processed in the sintering device are not limited and may be designed according to actual processes. For instance, in at least one embodiment of the present disclosure, after all the workpieces to be processed in the chamber of the sintering device complete the sintering process (including low-temperature heating and high-temperature heating), all the workpieces to be processed which have completed the sintering process are unloaded, and then a new batch of workpieces to be processed are mounted.

In the sintering method provided by the embodiment of the present disclosure, the specific structure of the sintering device and the specific operations of the structures in the sintering device may refer the relevant content of the foregoing embodiment (the embodiment of the sintering device). No further description will be given here in the embodiment of the present disclosure.

It should be noted that the heating mode of the heating mechanism is not limited in the embodiment of the present disclosure. For instance, the first heating mechanism is not limited to only adopt the high-temperature heating mode and may also be switched to adopt the low-temperature heating mode. Correspondingly, the second heating mechanism is not limited to only adopt the low-temperature heating mode and may also be switched to adopt the high-temperature heating mode, as long as one of the first heating mechanism and the second heating mechanism may provide high-temperature heating and the other one may simultaneously provide low-temperature heating. In the sintering process, the relationship between the heating modes of the first and second heating mechanisms may be exchanged. For instance, after the heating modes of the first heating mechanism and the second heating mechanism are switched, the bearing mechanism may also operate reversely, so as to ensure that the workpiece to be processed is subjected to low-temperature heating at first and then subjected to high-temperature heating.

Illustratively, in the sintering device as shown in FIG. 4, the workpiece to be processed is placed in the bearing position 310 through the first loading and unloading port 410; the bearing mechanism 300 operates so that the workpiece to be processed may be heated by the second heating mechanism 220 (low-temperature heating mode) at first and then heated by the first heating mechanism 210 (high-temperature heating mode); and the workpiece to be processed is took out through the second loading and unloading port 420. When the workpiece is took out, a new workpiece to be processed may be reloaded at the position of the second loading and unloading port 420. Correspondingly, the first heating mechanism 210 is converted from high-temperature heating mode to low-temperature heating mode, and the second heating mechanism 220 is converted from low-temperature heating mode to high-temperature heating mode; subsequently, the bearing mechanism 300 operates reversely so that the workpiece to be processed may be heated by the first heating mechanism 210 (low-temperature heating mode) at first and then heated by the second heating mechanism 220 (high-temperature heating mode); and the workpiece to be processed is unloaded after moving to the first loading and unloading port 410.

The sintering device and the sintering method thereof, provided by the embodiment of the present disclosure, may have one of the following advantages:

(1) In the sintering device provided by at least one embodiment of the present disclosure, the workpiece to be processed may be subjected to the sintering process at different temperatures in the same chamber and is not required to be transferred between different chambers (or devices), so the process consuming time can be reduced, the processing yield of the workpiece to be processed can be improved, the number of the devices can be reduced, and the cost can be reduced.

(2) In the sintering device provided by at least one embodiment of the present disclosure, by adoption of the bearing mechanism, the sintering device can complete the heating process of the workpiece to be processed by streamline automated operation mode, improves the working efficiency of the sintering device, and ensure high space utilization rate of the sintering device.

The following statements should be noted:

(1) The accompanying drawings involve only the structure(s) in connection with the embodiment(s) of the present disclosure, and other structure(s) can be referred to common design(s).

(3) For the purpose of clarity only, in accompanying drawings for illustrating the embodiment(s) of the present disclosure, the thickness of a layer or a region may be enlarged or decreased, that is, the accompanying drawings are not drawn according to the actual scale.

(3) In case of no conflict, features in one embodiment or in different embodiments can be combined.

What are described above is related to the specific embodiments of the disclosure only and not limitative to the scope of the disclosure. The protection scope of the disclosure shall be based on the protection scope of the claims.

The application claims priority to the Chinese patent application No. 201711042761.3, filed Oct. 30, 2017, the disclosure of which is incorporated herein by reference as part of the application.

The invention claimed is:

1. A sintering device, comprising:
a housing, defining a chamber;
at least one first heating mechanism and at least one second heating mechanism, disposed in the chamber; and
a bearing mechanism, disposed in the chamber and configured to hold at least one workpiece to be processed and allow the workpiece to be processed to be movable along a first track, the bearing mechanism including at least one bearing position, and the at least one bearing position being configured to hold the workpiece to be processed,
wherein the at least one first heating mechanism and the at least one second heating mechanism provide different heating temperature for the workpiece to be processed,
the first heating mechanism and the second heating mechanism are arranged along the first track,
a support frame is disposed in each of the at least one bearing position of the bearing mechanism and configured to fix the workpiece to be processed,
the support frame includes a base a clamping structure disposed on the base, the clamping structure defines the workpiece to be processed, the workpiece to be processed is fixed on the base,
the bearing mechanism includes a support shaft and a roller supported by the support shaft, the bearing position is disposed on the roller the roller rotates around the support shaft,
a tangent of the first track is perpendicular to a direction of a surface of the base on which the workpiece to be processed is fixed, the base and the workpiece to be processed are upright on the roller by being perpendicular to the first track.

2. The sintering device according to claim 1, wherein one of the bearing positions is configured to be aligned with any one of the first heating mechanism and the second heating mechanism.

3. The sintering device according to claim 2, wherein the bearing mechanism includes at least two bearing positions; and any two of the bearing positions are configured to be respectively aligned with the first heating mechanism and the second heating mechanism.

4. The sintering device according to claim 2, wherein a shape of the first track is straight line, curved line or zigzag line; and a movement mode of the bearing position along the first track is reciprocating movement or one-way movement.

5. The sintering device according to claim 2, wherein a shape of the first track is a closed ring.

6. The sintering device according to claim 1, wherein at least one of the first heating mechanism or the second heating mechanism is a laser beam heating unit.

7. The sintering device according to claim 6, further comprising:
at least one fine adjusting unit, configured to adjust positions of the first heating mechanism and the second heating mechanism so as to be aligned with a region to be heated of the workpiece to be processed.

8. The sintering device according to claim 1, wherein the support frame further includes an adsorption unit, and vent holes formed in the base; and the adsorption unit is configured to fix the workpiece to be processed through the vent holes.

9. The sintering device according to claim 1, wherein one of the first heating mechanism and the second heating mechanism is configured to adopt high-temperature heating mode, and the other is configured to adopt low-temperature heating mode.

10. The sintering device according to claim 9, wherein both the first heating mechanism and the second heating mechanism are configured to be switchable between the high-temperature heating mode and the low-temperature heating mode.

11. A sintering method employing a sintering device, the sintering device includes:

a housing, defining a chamber; and at least one first heating mechanism and at least one second heating mechanism, disposed in the chamber, wherein the at least one first heating mechanism and the at least one second heating mechanism provide different heating temperatures for a workpiece to be processed; and the sintering method comprises:

placing the workpiece to be processed into the chamber; and heating the workpiece to be processed by adoption of the first heating mechanism and the second heating mechanism to provide different heating temperatures, wherein the sintering device further includes a bearing mechanism which is disposed in the chamber and configured to hold the workpiece to be processed; the bearing mechanism includes at least one bearing position for holding the workpiece to be processed, a support frame is disposed in each of the at least one bearing position of the bearing mechanism and configured to fix the workpiece to be processed, the support frame includes a base, a clamping structure disposed on the base, the clamping structure defines the workpiece to be processed, the workpiece to be processed is fixed on the base, the bearing mechanism includes a support shaft and a roller supported by the support shaft, the bearing position is disposed on the roller, the roller rotates around the support shaft, a tangent of the first track is perpendicular to a direction of a surface of the base on which the workpiece to be processed is fixed, the base and the workpiece to be processed are upright on the roller by being perpendicular to the first track.

12. The sintering method according to claim 11, wherein one of the first heating mechanism and the second heating mechanism is configured to adopt high-temperature heating mode, and the other is configured to adopt low-temperature heating mode; the heating temperature of the high-temperature heating mode is higher than the heating temperature of the low-temperature heating mode; and the workpiece to be processed is subjected to low-temperature heating at first and then subjected to high-temperature heating.

13. The sintering method according to claim 12, wherein the method comprises:

moving the bearing position of the bearing mechanism to a loading position;

placing the workpiece to be processed in the chamber and loading the workpiece to be processed to the bearing position;

driving the bearing mechanism so that the bearing position is aligned with the second heating mechanism, and heating the workpiece to be processed by using the second heating mechanism;

driving the bearing mechanism so that the bearing position is aligned with the first heating mechanism, and heating the workpiece to be processed by using the first heating mechanism; and driving the bearing mechanism so that the bearing position moves to an unloading position, in which the first heating mechanism adopts high-temperature heating mode and the second heating mechanism adopts low-temperature heating mode.

* * * * *